March 27, 1951  J. L. HAYCOCK  2,546,503
SAW BLADE CONSTRUCTION
Filed Dec. 8, 1948

Joseph L. Haycock
INVENTOR.

BY
Attorney.

Patented Mar. 27, 1951

2,546,503

UNITED STATES PATENT OFFICE 2,546,503

SAW BLADE CONSTRUCTION

Joseph Langford Haycock, Napanee, Ontario, Canada

Application December 8, 1948, Serial No. 64,210

3 Claims. (Cl. 143—133)

This invention relates to saws, and more particularly to the tooth structure thereof.

An object of the invention is to provide a saw having teeth of simple structure and which may be employed for both cross-cutting and ripping, and which will result in the provision of an exceptionally true and smooth face on the surface produced on the material by sawing.

Figure 1:
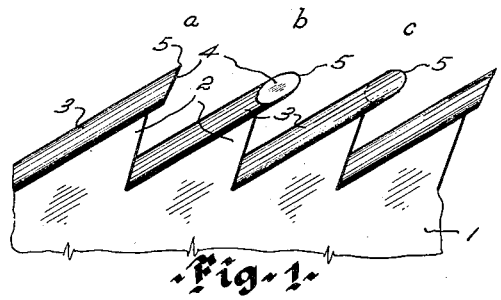
Figure 2:
Figure 4:
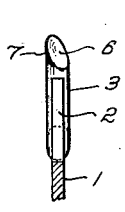
Figure 5:
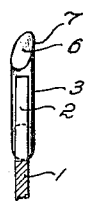
Figure 3:
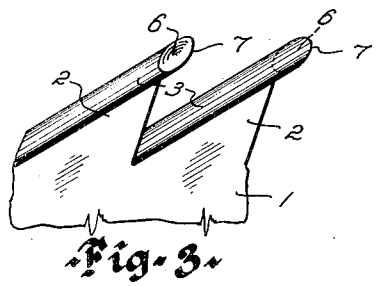
Figure 6:
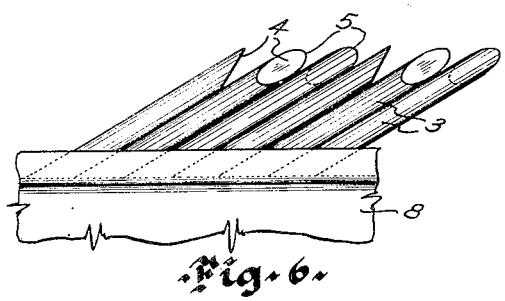

The invention will be described with reference to the accompanying drawing, in which Figure 1 is a partial side elevation of the toothed portion of a saw in accordance with the invention, Figure 2 is a sectional end elevation of one of the teeth shown in Figure 1, Figure 3 is a partial side elevation of another form of tooth structure, Figure 4 and Figure 5 are sectional end elevations of teeth shown in Figure 3, and Figure 6 is a partial side elevation of still another form of tooth structure.

Referring to Figures 1 and 2, 1 is a saw blade, which may be of the circular, band, hand, or chain saw type. The saw blade is provided with a plurality of tooth members 2, which may be integrally formed with, and lie in the same plane of, the blade. Fixed to the outer inclined edge of each member 2, as by welding, brazing, soldering, or the like, is a rod 3 of circular cross section. The outer end face 4 of each rod is inclined with respect to the axis of the rod and is sharpened to provide arcuate cutting edges 5 thereon. The angle of inclination of the face 4, as well as the angle of inclination of the rod itself, as governed by the angle of the inclined edges of the tooth member 2, will vary greatly in practice and will depend upon the character and function of the saw to be produced.

Each rod 3 is of uniform cross-section throughout its length and is of slightly larger diameter than the thickness of the blade members 2. Moreover, the axis of each rod coincides with the medial plane of the blade 1, whereby all the rods lie in the same plane.

The ends 4 of the rods 3, with the cutting edges 5, thus constitute the teeth proper of the saw in accordance with the invention. Figure 1 show one arrangement of such teeth, wherein the teeth are arranged in successive series each consisting of teeth a, b and c. One tooth a has its cutting face arranged at right angles to the plane of the saw, the next successive tooth b has its cutting face 4 arranged angularly to the plane of the saw with its leading edge on one side of the blade, and the next successive tooth c has its cutting face arranged angularly to the plane of the saw but with its leading edge on the opposite side of the blade. Such a saw is suitable for cross-cutting, the angularly arranged teeth scoring the material to be cut and the right angle tooth cutting away the scored material. Since the rods 3 lie in the same plane, i. e., do not extend angularly of the plane of the saw, as in the case of ordinary saws having "set" teeth, there is no sidewise cutting effect and no tendency of the saw to "wander" during the cutting operation. Thus, the cut produced is extremely true and has a very smooth surface.

Referring to Figures 3, 4 and 5, the rods 3 have honed concave end faces 6 each with a substantially semi-circular leading cutting edge 7. Such teeth may be arranged in pairs, one of which has its leading cutting edge 7 on one side of the plane of the blade and the other of which has its leading cutting edge on the other side of the plane of the blade. Thus, the two oppositely disposed semi-circular cutting edges 7 produce a full cut in the material.

Figure 6 illustrates a further modification wherein the rods 3 have their inner ends anchored to the saw blade 8 and extend angularly therefrom in abutting relation instead of being seated on tooth members. The cutting faces and edges of the rods may be arranged in a manner similar to that shown in Figure 1.

In some instances, it is desirable that the saw have all of its teeth similarly arranged in the manner illustrated at a in Figure 1, i. e., each tooth having its cutting face disposed in a plane at right angles to the plane of the blade. Such a saw may be employed for cutting lumber, metals, plastics, and the like.

What is claimed is:

1. A saw comprising a blade having a serrated edge portion, said edge portion having successive parallel inclined edges, and a rod fixed to each of said edges, each said rod being of substantially circular cross-section and uniform diameter greater than the thickness of the blade, each said rod having its axis coinciding with the medial plane of the blade and having an outer end inclined with respect to the axis of the rod, said end having a cutting edge.

2. A saw as defined in claim 1, wherein said rods are arranged in successive series of three, the first rod of each series having its inclined edge arranged in a plane at right angles to the plane of said blade, the second rod of said series having its inclined end angularly arranged with its leading edge on one side of the plane of the blade, and the third rod of said series having its inclined end angularly arranged with its leading edge on the other side of the plane of the blade.

3. A saw as defined in claim 1, wherein said rods are arranged in successive pairs, the inclined end of each rod being concave to present a substantially semi-circular leading cutting edge, the leading edge of one rod of the pair being disposed on one side of the plane of the blade, and the leading edge of the other rod of the pair being disposed on the other side of the plane of the blade.

JOSEPH LANGFORD HAYCOCK.

REFERENCES CITED

The following references are of record in the file of this patent:

UNITED STATES PATENTS

| Number | Name | Date |
|---|---|---|
| 192,090 | Spaulding | June 19, 1877 |
| 268,433 | Rex | Dec. 5, 1882 |
| 301,431 | Brown | July 1, 1884 |